US012450865B2

(12) United States Patent
Foussat et al.

(10) Patent No.: US 12,450,865 B2
(45) Date of Patent: Oct. 21, 2025

(54) METHOD AND SYSTEM FOR DETECTING LIQUID LEVEL INSIDE A CONTAINER (71) Applicant: N.V. Nutricia, Zoetermeer (NL)

(72) Inventors: Agathe Camille Foussat, Singapore (SG); Jiahang Song, Singapore (SG); Enzo Acerbi, Singapore (SG); Laurens Alexander Drapers, Utrecht (NL); Ruben Zadok Hekster, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 399 days.

(21) Appl. No.: 17/783,666

(22) PCT Filed: Dec. 10, 2019

(86) PCT No.: PCT/EP2019/084415
§ 371 (c)(1),
(2) Date: Jun. 9, 2022

(87) PCT Pub. No.: WO2021/115569
PCT Pub. Date: Jun. 17, 2021

(65) Prior Publication Data
US 2022/0375191 A1  Nov. 24, 2022

(51) Int. Cl.
*G06V 10/44* (2022.01)
*G06T 7/00* (2017.01)
*G06V 10/82* (2022.01)

(52) U.S. Cl.
CPC .......... *G06V 10/454* (2022.01); *G06T 7/0004* (2013.01); *G06V 10/82* (2022.01); *G06T 2207/20081* (2013.01); *G06T 2207/20084* (2013.01); *G06T 2207/30128* (2013.01)

(58) Field of Classification Search
CPC .... G06V 10/454; G06V 10/82; G06T 7/0004; G06T 2207/20081; G06T 2207/20084; G06T 2207/30128
See application file for complete search history.

(56) References Cited

U.S. PATENT DOCUMENTS

2019/0197466 A1* 6/2019 Hand, III ............... G06V 20/00

FOREIGN PATENT DOCUMENTS

| CN | 110428416 A | 11/2019 |
| WO | 2019-023376 A1 | 1/2019 |

OTHER PUBLICATIONS

CN110428416 Zhang et al, Nov. 2019, machine translated (Year: 2019).*

(Continued)

*Primary Examiner* — Jianxun Yang
(74) *Attorney, Agent, or Firm* — Ipsilon USA—NLO (57) ABSTRACT The invention provides a computer-implemented method of detecting a liquid level inside a container, the method comprising the steps of: capturing, by a camera of a portable device, a first image of the container; providing the first image to an input layer of a convolutional neural network, CNN; obtaining, from a final layer of the CNN, the liquid level inside the container in the first image; and storing the obtained liquid level, wherein the CNN is configured to identify features of a plurality of volume indicators of the container in the first image and determine the liquid level in the container in the first image based on the identified features.

26 Claims, 8 Drawing Sheets (56) References Cited

OTHER PUBLICATIONS

Baby feeding bottle, Shen, 2014; https://food.chemlinked.com/news/food-news/chinas-first-feeding-bottle-safety-standard-released (Year: 2014).*
Wide-Slice Residual Networks, Martinel et al, 2016 (Year: 2016).*
Appeal decision—*SuperGuide* v. *DirecTV*, 2004 (Justia) (Year: 2004).*
Xu et al., "Water Level Estimation Based on Image of Staff Gauge in Smart City", 2018 IEEE SmartWorld, Ubiquitous Intelligence & Computing, Advanced & Trusted Computing, Scalable Computing & Communications, Cloud & Big Data Computing, Internet of People and Smart City Innovations, p. 1341-1345.
Jiang et al., "CNN-Based Non-contact Detection of Food Level in Bottles from RGB Images", Dec. 8, 2018 (Dec. 8, 2018). Robocup 2008: Robocup 2008: Robot Soccer World Cup XII; [Lecture Notes in Computer Science; Lect.Notes Computer]. Springer International Publishing. Cham. pp. 202-213. XP047502103. ISBN: 978-3-319-10403-4.

* cited by examiner

METHOD AND SYSTEM FOR DETECTING LIQUID LEVEL INSIDE A CONTAINER

FIELD OF THE INVENTION

The present invention relates to a method and system for detecting a level of liquid inside a container.

BACKGROUND ART

The popularity of portable devices such as smartphones, has made it easier for caregivers to track the food and liquid (e.g., enteral nutrition such as milk or baby formula) intake, for instance, of an infant by the use of mobile applications installed on said portable devices. The applications currently available allow users to register and monitor food intake over time. Mobile applications (e.g., apps) may also have additional features such as setting reminders for the next meal and keeping track of the food composition, allowing the user to keep a detailed history of food intake. It can also be particularly convenient for caregivers of patients who are fed bottled nutritional compositions, such as Alzheimer's patients, patients with cachexia, patients with swallowing difficulties (dysphagia) etc., as it gives the caregivers the tools to register and monitor feeding history.

While these mobile applications may keep a detailed history of food intake from a bottle, the physical act of deriving the volume of liquid or semi solid composition in a bottle is performed manually and is an arduous task. Currently, the measurement of the amount of liquid, e.g. milk, inside a bottle is made by eye and has to be manually input, at times when the caregivers are busy with the infant or patient. This makes obtaining the volume readings a labour intensive and time-consuming task. Furthermore, as such readings are 'best guesses', the measured volume levels may still be inaccurate. This may lead to an incorrect volume being recorded.

There is therefore a need for a method and system for quickly and accurately measuring and storing the volume of liquid in a liquid container.

SUMMARY OF THE INVENTION

The invention provides a computer-implemented method of detecting a liquid level inside a container, the method comprising the steps of: capturing, by a camera of a portable device, a first image of the container; providing the first image to an input layer of a convolutional neural network, CNN; obtaining, from a final layer of the CNN, the liquid level inside the container in the first image; and storing the obtained liquid level, wherein the CNN is configured to identify features of a plurality of volume indicators of the container in the first image and to determine the liquid level in the container in the first image based on the identified features. In an embodiment according to the invention, the method further comprises a step of determining, by the CNN, whether the first image comprises a plurality of volume indicators of the container. If it does comprise the plurality of volume indicators, the CNN according to an embodiment of the invention is configured to identify the features of the plurality of volume indicators.

The invention thus provides a method for obtaining the liquid level (such as milk or other liquid/semi solid nutritional composition for e.g. tube feeding) in a container, by taking an image and, through the use of machine learning (such as by using a neural network like a convolutional neural network (CNN)), determining the liquid level in the container. This method therefore allows for a fast and accurate determination of the liquid level in an automated manner. By using a CNN which is configured (e.g. trained) to detect a liquid level in a container, and by identifying features of volume indicators of the container, the liquid level in the container can be accurately determined. The volume indicators of the container can be on the outer part of the container, the inner part of the container, or inside the container. The container has preferably at least a portion of a transparent or semi-opaque material, such that the liquid level inside the container and the volume indicators are at least partially visible in the captured images. This method completely removes the need for a user to manually determine the liquid level by eye, and removes any human bias to the liquid volumes, resulting in a consistent yet accurate liquid volume measurement.

In an embodiment according to the invention, the container is for infant nutrition, preferably a bottle for infant milk or milk formula. Suitable containers for liquid nutrition (fluid nutrition) include, but are not limited to, bottles, syringes, cups, canisters and containers connected to tubes used in assisted feeding (e.g. nasogastric canister). The liquid level inside the container is preferably entirely or at least partially visible to the naked eye.

In an embodiment according to the invention, capturing the first image further comprises providing, by the portable device, to a user, guiding information to orientate the camera so as to capture at least a part of the container including the liquid level and the plurality of volume indicators of the container. By ensuring that the first image includes the part or portion of the container where the liquid level is visible, and the plurality of volume indicators which can be identified or extracted to provide a reference value, the CNN can determine the volume of liquid in said container.

In an embodiment according to the invention, the plurality of volume indicators comprises at least one number (preferably at least two numbers) and a plurality of scale markings. In this way, a distance between the top and bottom of the volume indicators can also be used by the CNN. Different types of features can be identified, or a combination thereof, thereby putting less restrictions in the captured image, as the CNN will adapt and search for any features which can be used to obtain the liquid level. In an embodiment according to the invention, the plurality of volume indicators represents at least 80% of the total volume indicators of the container. In this way, it is not necessary that the whole container is visible in the first captured image.

In an embodiment according to the invention, the scale markings on the container comprise a volume scale at increments of 5 to 20 millilitres, ml, preferably 10 ml. This provides a scale for the spatial dimension of the container with which the CNN can determine the liquid level in the container.

In an embodiment according to the invention, capturing the first image comprises providing, by the portable device, guiding information so that the container is orientated perpendicularly with respect to a horizontal surface in the first image. Preferably, the horizontal surface is also flat or substantially flat, to allow the container to rest in a stable position. This allows the liquid level to be parallel with the flat horizontal surface and/or the volume indicators, allowing the CNN to efficiently determine the liquid level in the container.

In an embodiment according to the invention, the horizontal surface in the first image is at an angle with respect to a horizontal axis of the first image, the angle ranging from −45 to 45 degrees. The first image may thus be captured with the portable device inclined with respect to the container, and the CNN will be able to recognize the liquid level.

In an embodiment according to the invention, for determining the liquid level, the CNN considers (is configured to consider) that the liquid level includes a foam layer on top of a liquid layer. The top surface of the liquid is at the highest visible substance level in the container, and therefore can be used as the liquid level marker to determine the liquid level.

If the liquid in the container is milk, as milk is frothy, milk in a container may comprise a liquid layer and a frothy foam layer. The top surface (milk level) may then be taken as the top of the foam layer (which is about the liquid layer). This is also applicable for any (semi)opaque liquids contained in the container.

In an embodiment according to the invention, the method further comprises displaying, by the portable device, information about the obtained liquid level in the container in the first image. By displaying information about the obtained liquid level, the user (or parent or caregiver) can be informed of this value.

In an embodiment according to the invention, the method further comprises the steps of: capturing, by the camera, a second image of the container different from the first image, providing the second image to the input layer of the CNN and obtaining a liquid level inside the container in the second image, calculating, by the portable device, a difference in liquid level between the first image and the second image, and storing at least one of the obtained liquid level in the container in the second image and the calculated difference. The invention thus provides a method for obtaining the liquid level (such as milk level) inside a container, preferably for infant nutrition (such as a bottle for infant milk or infant formula) at two separate instances—such as before and after the liquid intake—but also for storing the liquid volume consumed by taking the difference in liquid level between the two images. This allows the user to keep track of the liquid volume consumed, for example the milk level consumed by the infant in addition to the liquid volume measured at a specific instance.

In an embodiment according to the invention, the method further comprises displaying information about at least one of the obtained liquid level in the container in the second image, and information about the calculated difference.

In an embodiment according to the invention, the CNN is a deep CNN, more specifically a residual neural network, ResNet modified by one or more of: removing a final layer of the ResNet, inserting classes for classification of liquid level, and inserting additional fully connected layers, performing dropout in the fully connected layers, introducing a regularization term, adding two dimensional convolutions, applying weight quantization, and folding convolutional layers onto each other. The CNN used in embodiments of the present invention thus provides a compact structure which allows it to be implemented in a portable device, yet achieving an accurate liquid level determination. For the purposes of the present disclosure, the term CNN is considered to also encompass deep learning architectures such as ResNets.

The invention further provides a system for detecting a liquid level inside a container, the system comprising: a portable device comprising a camera configured to capture a first image of the container; a processor configured to provide the first image to an input layer of a convolutional neural network, CNN, and to obtain, from a final layer of the CNN, the liquid level inside the container in the first image, and a storage medium configured to store the obtained liquid level, and, the CNN being configured (e.g. trained) to, identify features of a plurality of volume indicators of the container in the first image, and to determine the liquid level in the container in the first image based on the identified features.

In an embodiment according to the invention, the container is a bottle for infant nutrition, preferably a bottle for infant milk or milk formula.

In an embodiment according to the invention, the processor is further configured to control the portable device to provide guiding information during capturing of the first image so as to orientate the camera to capture at least a part of the container including the liquid level and the plurality of volume indicators of the container.

In an embodiment according to the invention, the plurality of volume indicators comprises at least one number and a plurality of scale markings. Where the present disclosure indicates that a CNN is configured to e.g. identify certain features, or extract certain feature points, that may mean that the CNN is trained with training data that is chosen by a person skilled in the art to make the trained CNN sensitive to said features or feature points. For example, making a CNN sensitive to at least one number in the volume indicators may mean providing the CNN with training samples with various volume indicators but otherwise similar bottles. Such training set would force the CNN to "pay attention" to the features or feature points making up the volume indicators as the sole source of information for a correct classification. This will thus make the CNN adapt to the desired features or feature points.

In an embodiment according to the invention, the plurality of volume indicators represents at least 80% of the total volume indicators of the container.

In an embodiment according to the invention, the scale markings of the container comprise a volume scale at increments of 5 to 20 millilitres, ml, preferably 10 ml.

In an embodiment according to the invention, the processor is further configured to control the portable device to provide guiding information during capturing of the first image so that the container is orientated perpendicularly with respect to a horizontal surface in the first image.

In an embodiment according to the invention, the horizontal surface in the first image is at an angle with respect to a horizontal axis of the first image, the angle ranging from −45 to 45 degrees.

In an embodiment according to the invention, for determining the liquid level, the CNN is configured to consider that the liquid level includes a foam layer on top of a liquid layer.

In an embodiment according to the invention, the portable device further comprises a display configured to display information about the obtained liquid level in the container in the first image.

In an embodiment according to the invention, the camera is further configured to capture a second image of the container different from the first image; the processor is further configured to provide the second image to the input layer of the CNN, to obtain a liquid level inside the container in the second image, and to calculate a difference in liquid level between the first image and the second image, and the storage medium is further configured to store at least one of the liquid level in the container in the second image and the calculated difference.

In an embodiment according to the invention, the CNN is a modified residual neural network, ResNet in which one or more of the following modifications have been made: a final layer of the ResNet has been removed, classes for classification of liquid level have been inserted, additional fully connected layers have been inserted, dropout in the fully connected layers has been performed, a regularization term has been introduced, two dimensional convolutions have been added, weight quantization has been applied, and convolutional layers have been folded onto each other.

In an embodiment according to the invention, the CNN is implemented in the portable device. In an embodiment according to the invention, the CNN is implemented in a server communicating with the portable device.

In an embodiment according to the invention, the container comprises a top surface, a bottom surface, and a side surface, and wherein the top surface is removable from the container.

BRIEF DESCRIPTION OF THE DRAWINGS

The present invention will be discussed in more detail below, with reference to the attached drawings, in which.

DESCRIPTION OF EMBODIMENTS

Figure 1:
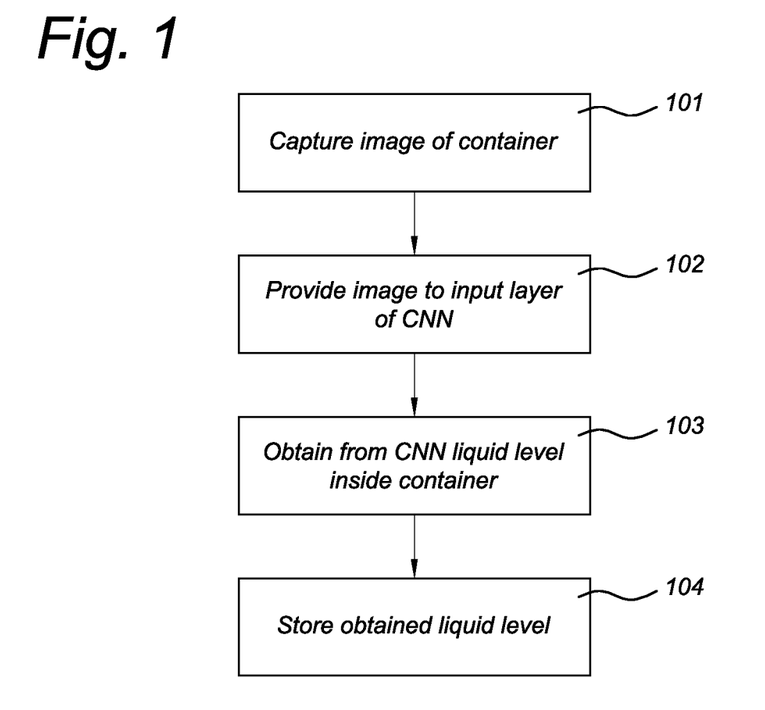
FIG. 1 depicts a flowchart showing a method according to embodiments of the present invention.

FIG. 1 depicts a flowchart showing a method according to embodiments of the present invention.

In step 101, an image is captured, preferably with a camera of a portable device, or with any other image capturing device. In step 102, the image is provided to the input layer of a deep neural network, DNN, such as a convolutional neural network, CNN. Before providing a further description of the method steps, a CNN according to the present invention is explained.

A CNN is a network that is trained on more than a million images from an image database, such as the ImageNet database. A CNN is made up to a certain number of layers and can classify images into different object categories. As a result, the network is taught the feature representations for a wide range of images. The CNN can be implemented using several libraries, such as the Tensorflow library and the Keras library, and can also be implemented into programming languages such as Python, C, C++, and the like and may run on a single or multiple processors or processor cores, or on a parallel computing platform such as CUDA.

The CNN takes an image as an input, and then outputs a label (or a vector) for the object in the image together with the probabilities for each of the object categories. The CNN may require the input image to be of size 224 by 224 pixels. If the input image differs from the allowed input size of 224 by 224 pixels, then a pre-processing step is performed whereby the image is resized (by either upscaling or downscaling), or cropped in order to fit the required input size of 224 by 224 pixels.

In order for a CNN to be able (to be configured) to classify images, it first needs to be trained to recognize the available classifications. This can be performed by using a pre-trained network in a method commonly described as a transfer learning method. The transfer learning method uses the pre-trained network as a basis for the CNN, as the early layers of the pre-trained network have already learned low-level features (such as edges and colours), and the last layers have learned more task-specific (mid- to high-level) features. Typically, as the CNN only requires a select subset of classes, from all of the available classes, the transfer learning method copies the early layers of the pre-trained network to the early layers of the CNN, but creates a new set of last layers for the CNN so that the 'new' last layers can learn features that are specific to the particular data set for the subset of classes. This greatly reduces the learning time required for the CNN.

After the CNN learns the classifications, it must then be taught how to classify a new set of images into the classifications. This is performed by inputting training images to the CNN. The training images can be stock images, test images and even simulated images. In order to obtain classification accuracies of over 90%, it is preferred to use many images for training, ranging from 5,000 to 10,000 images, and more preferably 8,000 to 9,000 images. The training images may include images created with image augmentation, by performing transformations like rotating, cropping, zooming, colouring based methods. This increases the robustness of the CNN. The convolutional layers of the CNN extract image features that the last learnable layer and the final classification layer use to classify the input image. These two layers contain information on how to combine the features that the CNN extracts into class probabilities and predicted labels. In order to train the CNN, these last layers are then modified or replaced with new layers adapted to the new data set.

In most networks, the last layer with learnable weights is a fully connected layer, which multiplies the input by the learned weights. During the training, this layer is replaced with a new fully connected layer with the number of outputs equal to the number of classes in the new data set. By increasing the learning rate of the layer, it is possible to learn faster in the new layer than in the transferred layers.

The classification layer specifies the output classes of the network. During the training, this layer is replaced with a new classification layer that contains no class labels, and the training automatically adds the output classes of the layer.

Once trained, the CNN is able to classify the image and calculate the class probabilities.

The CNN can also be retrained on a new set of images. This can be performed from scratch—i.e. starting from extracting the early layers of the pre-trained network, to only training a few selected layers while leaving the remaining layers untouched. The latter is usually referred to as "freezing" layers, wherein the training process only modifies or updates the parameter of a select group of layers, while ignoring (or "freezing") the other layers.

In embodiments of the present invention, a CNN created by modifying a ResNet such as the standard ResNet-50 network is used to determine the liquid level. The residual network ResNet-50 is a CNN comprising 50 layers. ResNet-50 is suited for transfer learning by, for example, adding or subtracting layers or fine tuning pre-trained layers. In an embodiment of the present invention, the ResNet-50 network, trained on the ImageNet database, is modified and optimized such that the CNN can be implemented on a portable device. The modifications are described in detail below, in connection with FIG. 2.

Figure 2:
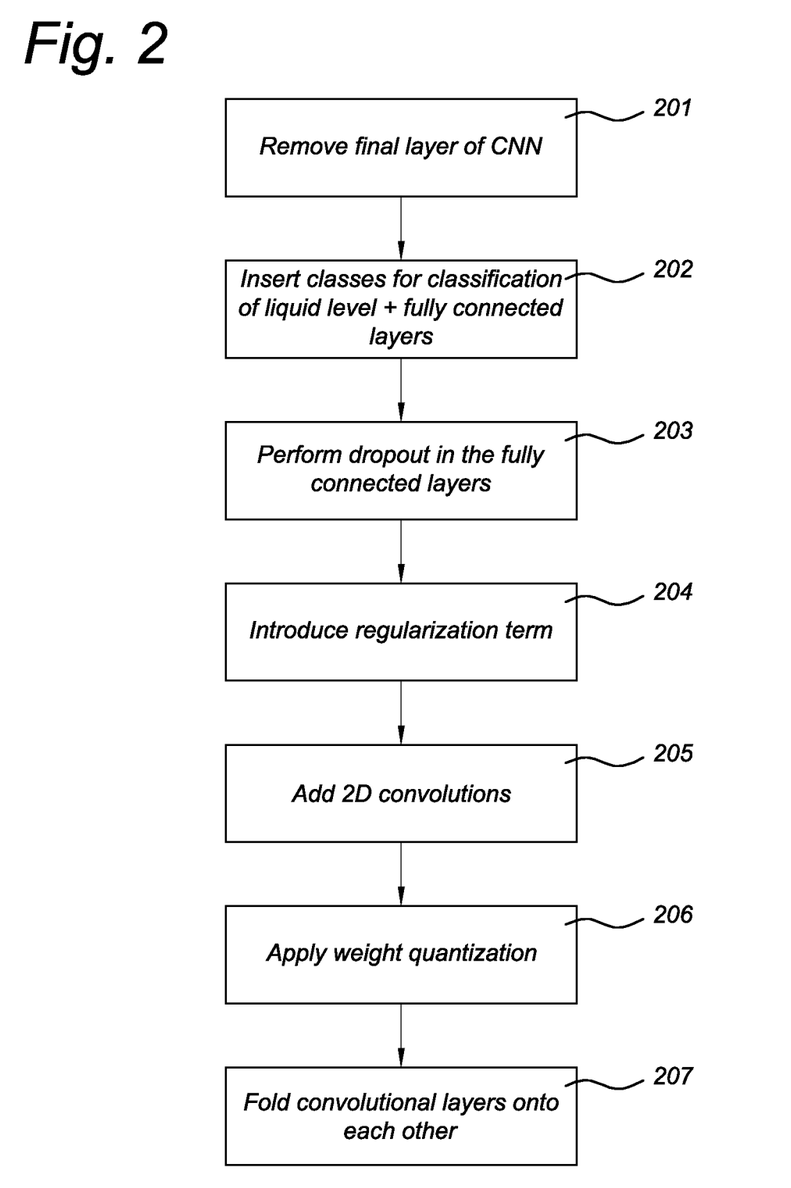
FIG. 2 shows a method for obtaining a CNN according to embodiments of the present invention.

Firstly, the final (softmax) layer is removed (201) to insert (202) the classes used for the classification of the liquid level. Furthermore, several fully connected layers are added to the last layers of the network to improve classification accuracy.

Secondly, a dropout is performed (203) in the added fully connected layers to prevent overfitting. A dropout is the random deactivation of several neurons (the basic units of the neural network). This results in the neurons being unable to learn, and thereby generating a model that is more robust to different types of images. In other words, even if some neurons are deactivated, the model is still able to accurately determine the milk levels.

Thirdly, a regularization term is introduced (204) in the hidden layers. This prevents further overfitting by the network by introducing a term in the loss metric of the network that incorporates the norms of the weight vectors, in order for all the weights to contribute to the classification layers, and not just specific weights. This results in a more mathematically robust network.

Fourthly, two-dimensional (2D) convolutions are added (205) to improve the channel-wise analysis of the network, using filters that act on each colour channel separately.

Fifthly, weight quantization, where means weights are cast into integers after being quantized, is applied (206) to reduce latency by decreasing the number of floating point operations that needs to be performed, thereby reducing the computational requirements necessary in order to operate the CNN. The advantageous effect is that small, less-powerful devices, such as portable devices, are able to perform the CNN instead of having an external device performing the CNN process.

Finally, the convolution layers are folded (207) onto each other using folded batch normalization. Batch normalization is used to normalize the input layer and adjust the scaling of the activations (by making the inputs to have a mean of zero with unit variance). Folded batch normalization consists of "folding", that is, merging, or combining the mathematical operations of the batch normalization layers with the convolution layers. This further reduces the amount of computation that needs to be performed on a portable device by reducing the number of layers which results in a quicker training speed.

The applicant has found that the above described modifications result in a CNN that works well for the purpose of the present disclosure. However, in the interest of balancing performance with other priorities (such as complexity), the skilled person may choose to omit one or more of the above modifications.

Furthermore, for parameter search in the optimal structure for the regularization terms, the amount of neurons in the fully connected layers, the dropout rate, and the amount of quantization are determined during intensive training of the CNN.

The above-mentioned modifications and optimizations result in a CNN comprising a reduced number of layers in comparison with the standard 50 layers of ResNet-50, while providing classification accuracies well above the standard ResNet-50. Due to a smaller, more compact CNN, with quantized weights as shown above, the memory and processing requirements to operate the CNN are lower, thereby allowing electronic devices with low processing power and smaller available memory capacity, such as portable devices and tablets, to be able to independently operate the CNN on said electronic device.

As the CNN can be implemented in a portable device, it can be further trained on specific classifications of liquid levels. For example, if the user only has a certain type of milk bottle, then the CNN will be configured to classify the liquid level on the same bottle. For such cases, the CNN can be configured to train for that specific type of milk bottle, thereby resulting in more accurate and robust classifications. The CNN used in embodiments of the present invention is trained with a plurality of types of bottles, so as to provide an accuracy of 95% in the liquid level determination when the bottles used in the training phase are used, and allowing also for a determination of liquid level in other similar bottles even if not used in the training phase.

Returning now to FIG. 1, after providing the image to the input layer of the CNN, the (early layers of the) CNN identifies or extracts features of the image. In an embodiment of the present invention, features may be identified or extracted from volume indicators of a container, such as located on the side of the container (such as a bottle—throughout the description, the terms container and bottle may be used interchangeably). The volume indicators may include scale markings and also numbers, which may be in units of (milli)litres or fluid ounces or any other unit of volume. Preferably, the captured image includes information about the scale units—(milli)litres or fluid ounces or the like—which, is usually located in proximity with the volume indicators. The scale markings may be positioned at set intervals, where the volume increases linearly along the scale markings. In such cases, while the scale markings are positioned at set intervals, the numbers may be present at a different set interval. For example, while the scale markings may be present at intervals of 10 ml, the numbers may be present at intervals of 50 ml, and may be represented as '50', '50 ml', or the like.

After providing the image to the input layer, an additional step may be performed by the CNN, said step comprising determining whether the first image comprises a plurality of volume indicators of the container. If it does comprise the plurality of volume indicators, the CNN may be configured to identify the features of the plurality of volume indicators.

After identifying the features, the CNN performs further feature identification in the later layers, and classifies the image and calculates the class probabilities using the identified features obtained from the different layers. The probabilities are calculated based on the features extracted from an image database during, for example, the pre-training stage or the training stage.

In step 103, the liquid level inside the container is determined (obtained) from the final layer of the CNN. Determining the liquid level may consist of providing an output which may be given by the CNN as a one-dimensional vector which comprises the probabilities for all classifications. The output may be given in a singular manner—i.e., only outputting the classification with the highest probability, or outputted in a plural manner, such as a list of the top 5 highest probability classifications, or a list of all probabilities for all classifications. An example of the output can be a vector which gives probabilities for the following values, for example in units of millilitres: 0, 20, 30, 40, 50, 60, 70, 80, 90, 100, 110, 120, 125, 130, 135, 140, 150, 160, 170, 180, 190, 200, 210, 220, 230, 240, 250, 260, 300.

When the liquid level is between two volume indicators, the CNN may output a label corresponding to a volume indicator above or below the position of the liquid level, such as the closest volume indicator to the liquid level. When the liquid level represents a full container, the CNN may output a label corresponding to the maximum liquid level, such as 300 ml. The liquid level of a full container is usually not readable by the human eye because there is usually no marking indicating the maximum value. The CNN provides in this situation a more accurate measurement than the human eye.

In step 104, the obtained liquid level is stored by the portable device. It may be stored in a memory of the portable device itself, or in a server in communication with the portable device.

Figure 3:
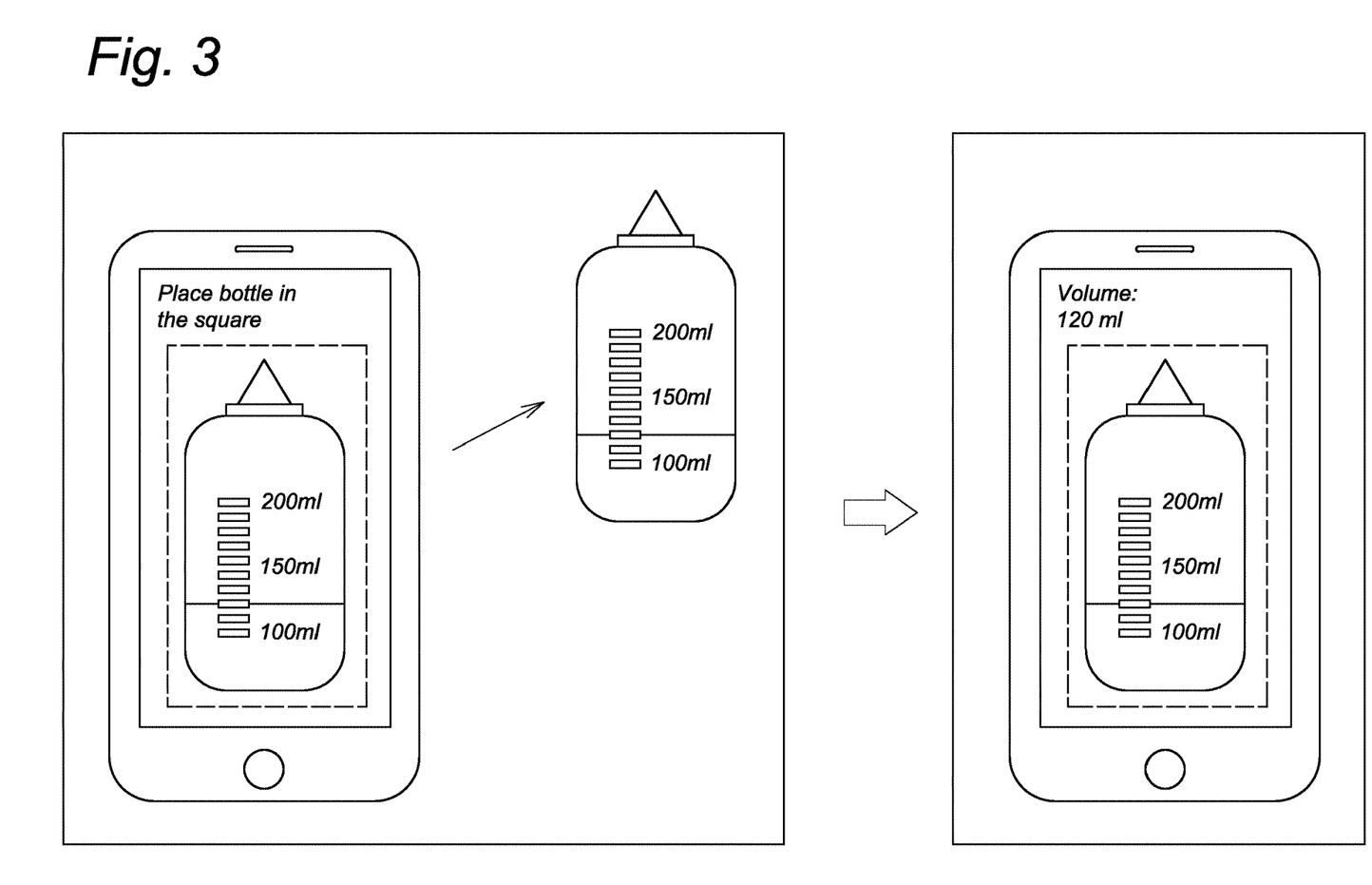
FIG. 3 schematically represents different steps of the method according to embodiments of the present invention.

FIG. 3 represents different steps of the method according to embodiments of the present invention. As seen in FIG. 3, the portable device may have an application installed therein to capture the image of the container (such as a container for infant nutrition, such as a milk bottle). In embodiments of the present invention, the portable device may execute the application to capture the image of the milk bottle. The application may provide guiding information to the user operating the portable device to obtain an image of the bottle. This may be performed, for example, by the portable device displaying a shape indicating the maximum allowable pixel size for the image to be used as an input by the CNN layer. For example, the shape may be a square of a specific size, such as 224 by 224 pixels. This may also be performed by displaying text that indicates where the bottle should be placed within the screen when the image is to be captured (such as "Place bottle in square", or the like), and/or in which position with respect to a horizontal surface. The captured image may be in greyscale or in colour. If the image is larger than the specific size, a pre-processing step may be performed by the CNN to resize the image to the specific size.

In embodiments of the present invention, the guiding information may also indicate that the portable device be placed at a pre-determined distance from the container (bottle), in order for the camera to capture an image of the bottle. Preferably, this distance is between 10-50 cm, most preferably between 20-30 cm.

The guiding information may also indicate that the container (bottle) be preferably placed on a horizontal or substantially horizontal surface. The bottle should be preferably orientated vertically, that is, oriented perpendicularly to the substantially horizontal surface, such that the bottom of the bottle is in contact with the substantially horizontal surface. The substantially horizontal surface is preferably also substantially flat, so that the bottom of the bottle can rest in a stable position.

The guiding information can be provided in alternative ways. For example, the guiding information can be provided before an image is taken giving general information about how to position the camera. The guiding information can also or alternatively be provided after the image is captured and a lightweight algorithm is executed, which detects possible suboptimal conditions in the image. Additionally or alternatively, the guiding information can be provided after the image is captured and input to the CNN, and the CNN is unable to provide a classification. In the two last cases, the application may include co-operative functions in order to obtain an input image for the CNN without the need for pre-processing. For example, the application may be configured to communicate with the CNN, or the CNN may be part of the application, to determine whether a preview image of the bottle, obtained while guiding the user, contains a minimum required liquid level and/or (number of) features in order for the CNN to classify the volume. This may include determining whether the whether the captured image comprises a plurality of volume indicators of the container.

The captured image should contain the liquid level inside the bottle and a plurality of volume indicators for the CNN to extract in order to classify the volume of the liquid level. The image capturing device, such as the camera of the portable device, may guide the user to include a minimum number of volume indicators. If the minimum number is not met, the image capturing device may prompt the user to capture another image.

In an embodiment, the portable device may be orientated in any direction with respect to the container, and the image of the bottle can be captured at any angle, provided that the condition of the minimum number of volume indicators is met. For example, the CNN may be configured to obtain the liquid level in a container from an image captured by the camera of the portable device where the camera is orientated up to 45 degrees with respect to the horizontal surface on which the bottle is placed, provided that liquid level and minimum number of volume indicators are present in the captured image. Additionally or alternatively, the CNN may be configured to obtain the liquid level in the container from an image captured by the portable device where the camera is orientated up to 45 degrees with respect to the vertical position of the bottle, provided that the liquid level and minimum number of volume indicators are present in the captured image.

In an embodiment, the camera may capture an image which contains unwanted effects, such as camera jitter, blurriness of the object, low-brightness situation. For such cases, the CNN may elect to not perform pre-processing steps to correct for these effects, and rely on the accuracy of the network to determine the classification probabilities.

The guiding information may also indicate that most of the volume indicators should be visible in the image, and/or that the volume indicators should be facing the direction of the camera of the portable device. However, the invention is not limited to this.

Figure 4:
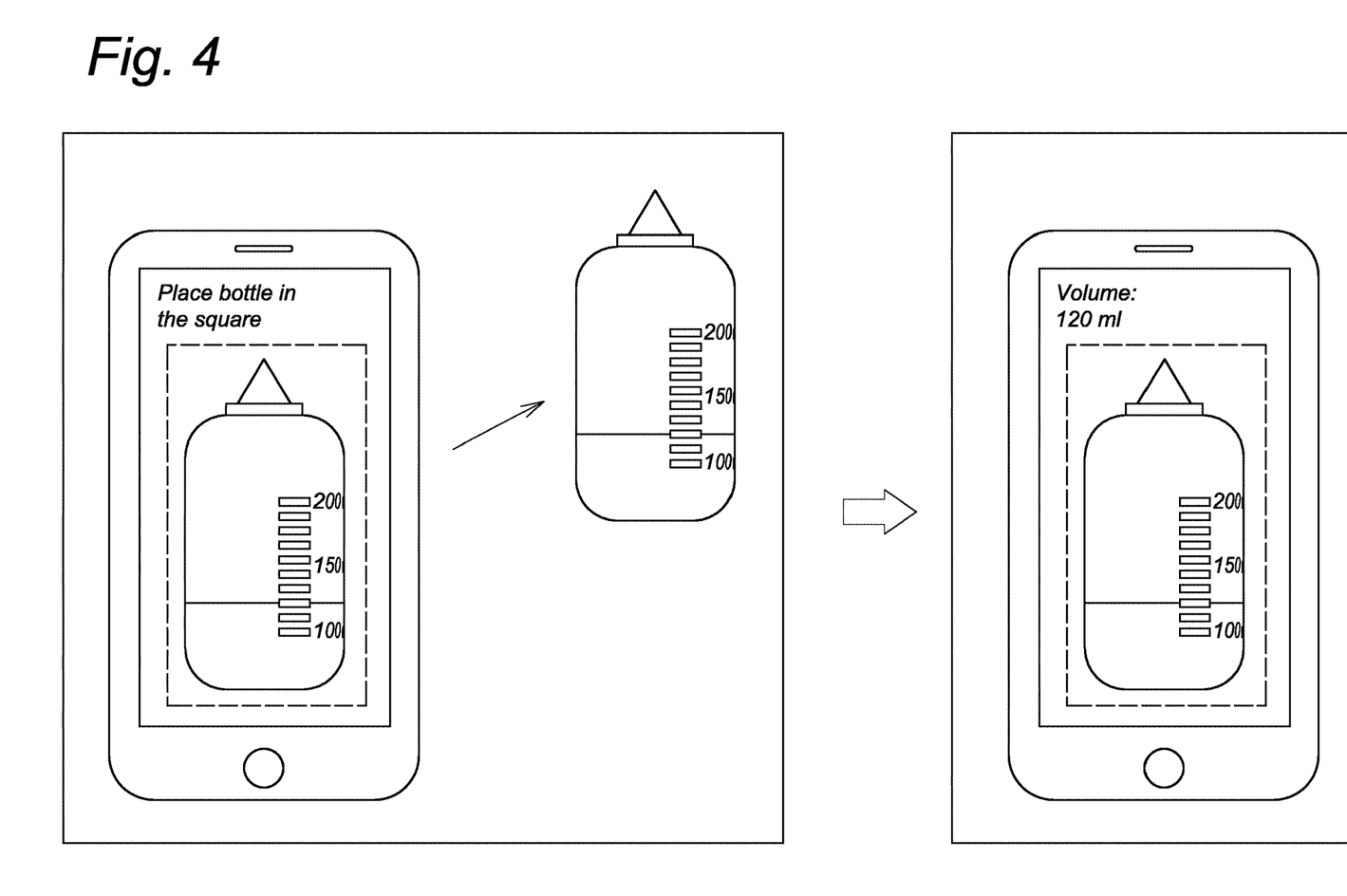
FIG. 4 schematically represents different steps of the method according to embodiments of the present invention.

FIG. 4 schematically represents different steps of the method according to embodiments of the present invention. The steps shown in FIG. 4 show an embodiment in which the volume indicators (comprising numbers and scale markings) are not facing the direction of the camera, but are partially facing sideways such that only a part of the volume indicators is captured by the camera. However, even if the volume indicators are not facing the direction of the camera, as long as at least a part of the volume indicators is visible, the CNN will be able to recognize the volume. That is, the CNN is configured to obtain the liquid level in the container from an image in which the volume indicators are not completely visible because they are facing a side of the container with respect to the camera direction. Preferably, among the volume indicators which are visible, also at least a part of a volume indicator including a (volumetric) number should be visible.

Figure 5:
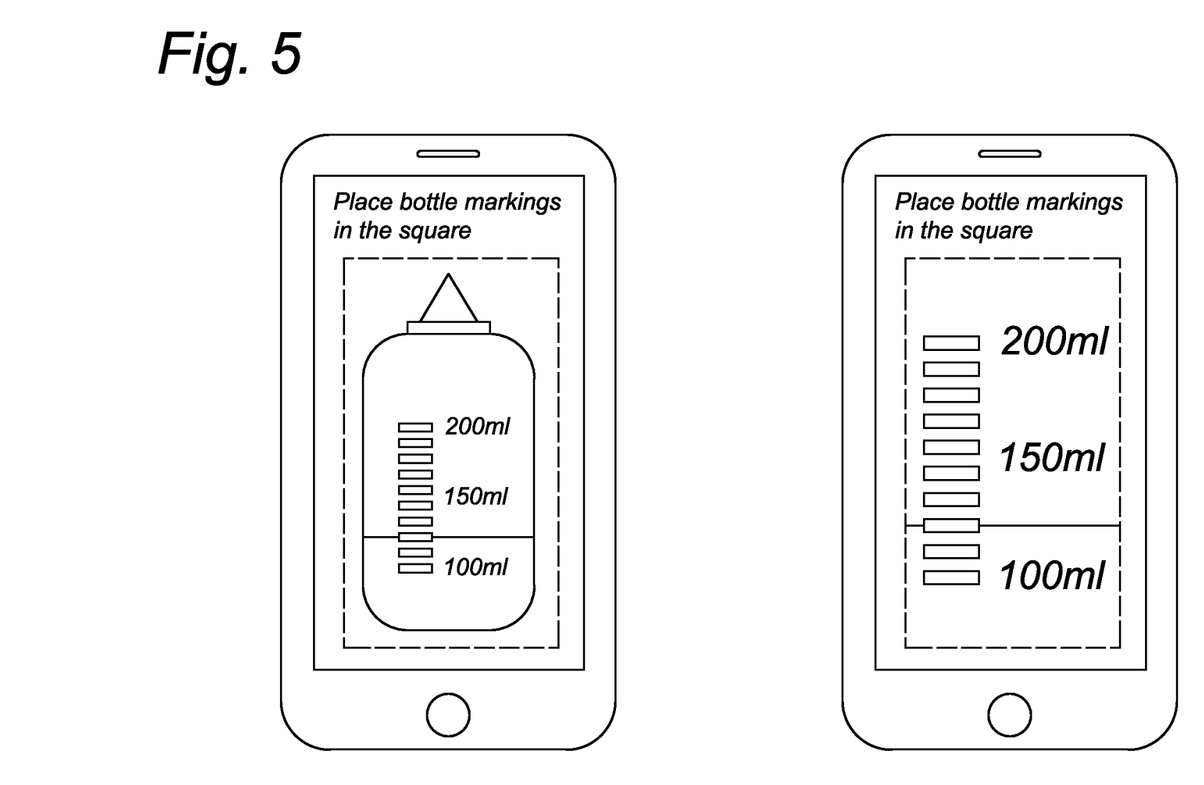
FIG. 5 schematically represents different steps of the method according to embodiments of the present invention.

FIG. 5 shows also different steps of the method according to embodiments of the present invention. According to embodiments of the invention, the CNN is able to obtain or determine the liquid level if all the volume indicators are visible in the captured image, but also without all of the volume indicators being visible. As seen in FIG. 5, it may be sufficient only to capture an image of a subset of the volume indicators to determine the liquid level. This subset is preferably at least 80% of the volume indicators, and not inferior to 70%. In such case, the whole bottle is not visible in the captured image, and only a portion of the bottle containing a portion of the volume indicators is visible, and therefore the user of the portable device needs not check too carefully whether the whole bottle is fitted in the captured image. In order for the correct volume to be determined, it is preferable that among the visible volume indicators, also at least one volume indicator including a number is visible.

According to embodiments of the invention, some parts of the container may be semi-transparent or opaque, as long as an area of the container comprising (at least a portion of) the volume indicators is transparent or almost completely transparent, so that the liquid level is visible in relation with the volume indicators.

According to embodiments of the present invention, the CNN may also or alternatively identify or extract features from the shape of the container (such as a bottle) itself. Bottles, especially bottles containing liquid, are distinctive from one another. For example, in the beverage industry, the carbonated drinks bottles differ from the milk bottles. Furthermore, depending on the brand, there are a number of variations of milk bottle shapes available on the market. This means that, by extracting the features related to the edges and/or contours of the bottle, the CNN may use these features to determine the type of bottle. By determining the bottle type, the CNN may then use this information to more accurately classify the volume inside the bottle.

The liquid level may be defined as the top layer of the liquid inside the bottle. The liquid level may also be defined as the top layer of the liquid inside the bottle including a foam layer above the top layer. The foam layer is a mixture of gas and liquid, and could therefore also be included in the classification of the liquid level inside the bottle.

There are several types of bottles that are available on the market, even for specific field such as milk bottles. As every bottle may have its own distinct shape and a different set of volume indicators (such as scale markings), the CNN can then be (re-)trained to perform classification on the various available bottles.

For each different type of bottle, the final two layers (the fully connected layer and the classification layer) may be adapted, modified or replaced in order to teach the CNN of the new classifications. Furthermore, since the classification for each type of bottle is different, the classification layer may be adapted to only output the relevant classifications for the type of bottle.

For each different type of bottle, the early layers may be adapted to extract the shape of the bottle and the type of volume indicators present on the bottle as the feature points.

Figure 6:
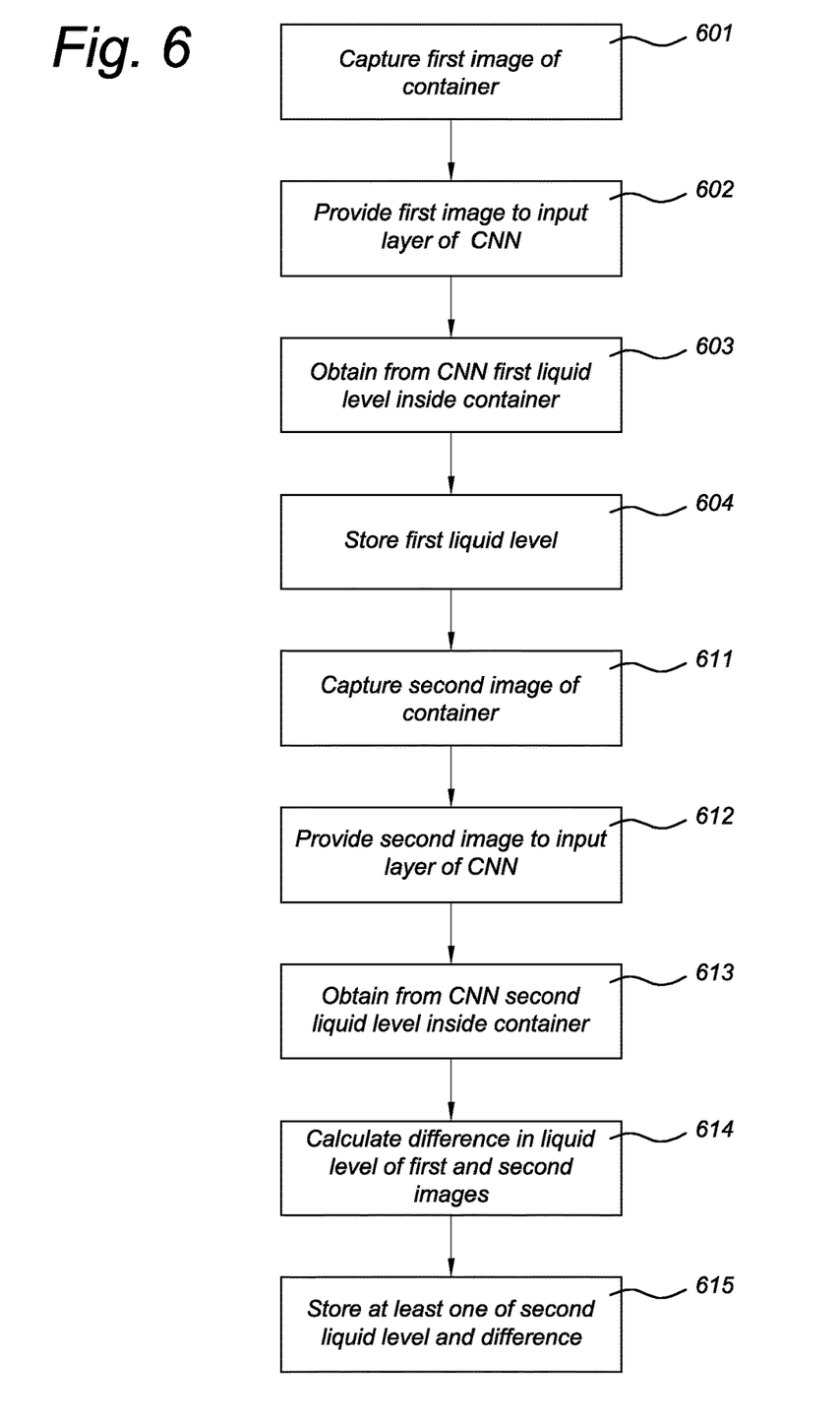
FIG. 6 depicts a flowchart showing a method according to embodiments of the present invention.

FIG. 6 depicts a flowchart showing a method according to embodiments of the present invention.

Steps 601 to 604 are similar to steps 101 to 104 already described for FIG. 1. Additionally, the application may be further configured to, in step 611, obtain a second image of the container (such as milk bottle) using the camera. In step 612, the application then provides the captured image to the CNN. In step 613, the application obtains the classification of liquid level from the CNN. In step 614, the application then calculates the difference in the liquid levels of the classification of the first image with the classification of the second image, and recognizes the difference in the form of a difference in volume between the two images. In step 615, the application stores at least one of the classification of the liquid level in the second image and the calculated volume difference. Additionally, the application may display the difference and/or the two determined volumes to the user. It is to be noted that the different steps and considerations provided above for capturing and analysing the first image, as well as the provision of guiding information, also apply for the second image and subsequent images taken thereafter.

In this manner, the application is able to store and track the liquid consumption, such as the milk intake of an infant.

Provided that the two images used for classification of the liquid level are taken using the same container, the tracking of liquid volume is independent of the type of container when using the CNN. This is due to the CNN having been trained for different types of containers, such as different types of milk bottles. For example, container A could be used in the morning, and container B—which differs from container A—could be used in the afternoon to feed an infant or a patient. Furthermore, container C—which differs from both containers A and B—can be used in the evening. This means that the user and the application are not limited to one type of container, and if the CNN is trained on another type of container, the application will be able to store and track the liquid volume and liquid intake of an infant or patient.

Figure 7:
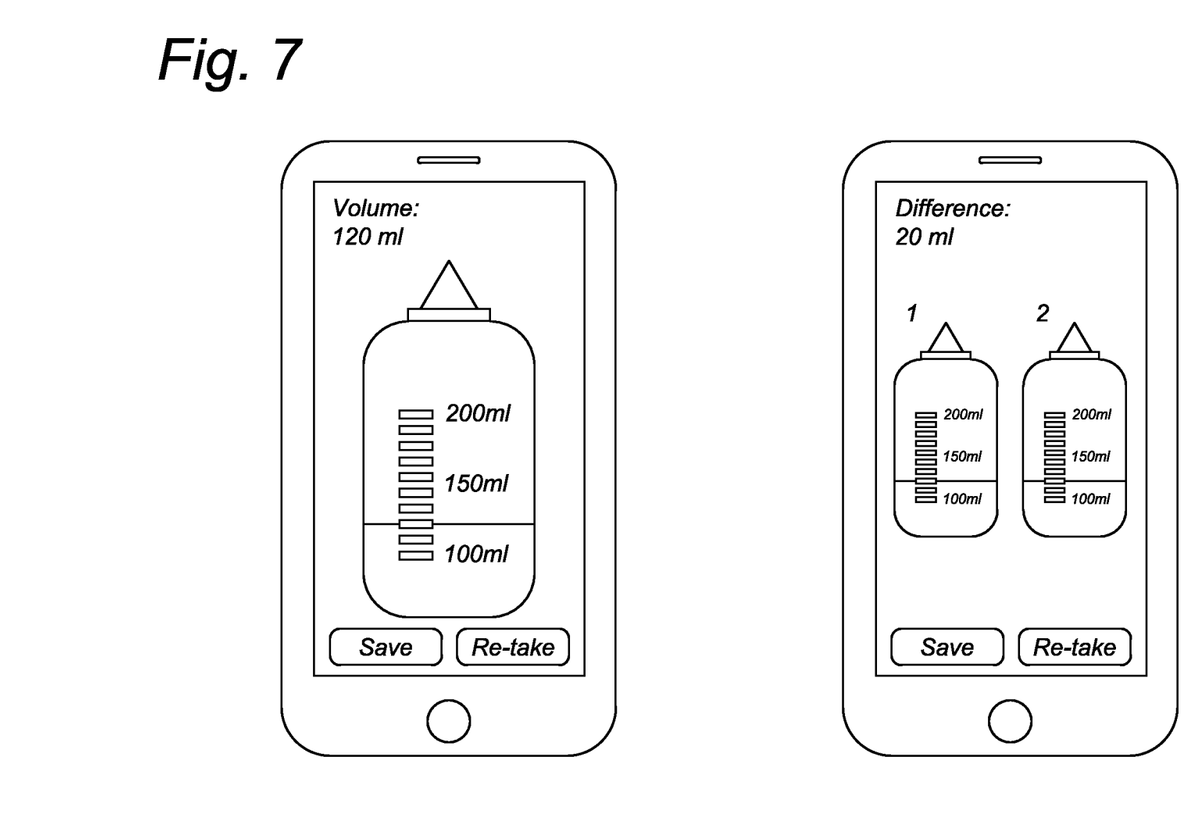
FIG. 7 schematically represents different steps of the method according to embodiments of the present invention.

FIG. 7 schematically represents different steps of the method according to embodiments of the present invention. A first image is captured, for example before the liquid (milk) intake. Once the volume is determined, it is possible to finalize the operation by saving the measurement, or to have the option to capture a second image, for example after the intake, in order to obtain the difference in value.

Figure 8A:
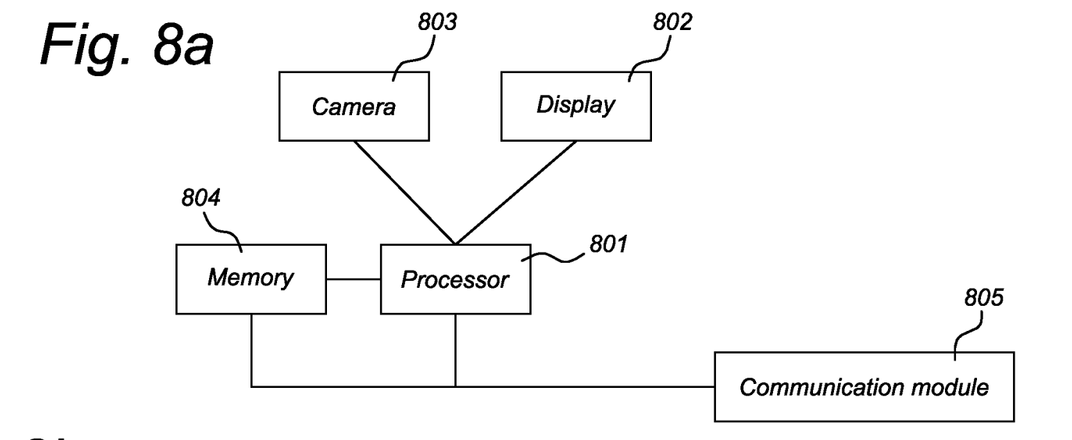
FIGS. 8a and 8b depict the system according to embodiments of the present invention.
Figure 8B:
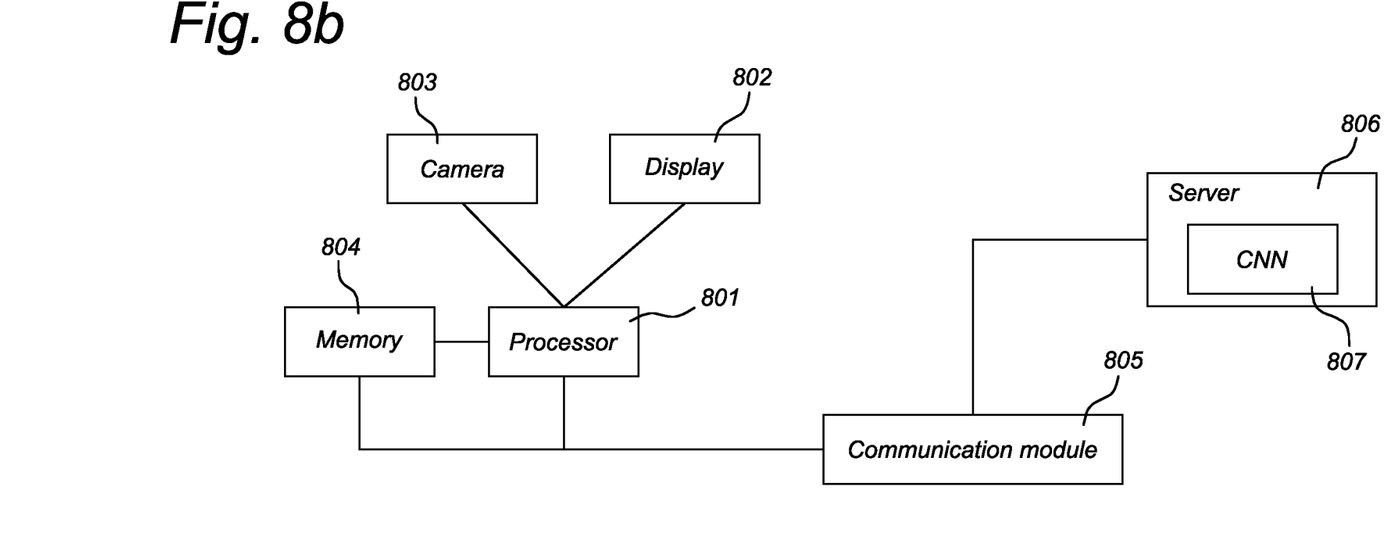

FIGS. 8a and 8b depict the system according to embodiments of the present invention. FIG. 8a shows how the CNN may be implemented as part of the portable device comprising a display 802, a camera 803, a processor 801, a memory 804 and a communication unit, for example as part of an application stored in the memory 804 of the portable device and executed by the processor 801 of the portable device. In this implementation, the application can be executed, an image can be captured using the camera 803, and therefore the liquid level can be determined, and displayed in the display 802, without requiring any network connection with a server, and therefore without access to the internet. Because the CNN is a special CNN which has a compact size, the processor of the portable device can execute the CNN as it does not need much computational power.

FIG. 8b shows how the CNN 807 may be implemented in a server 806 which can be in communication with the portable device via the communication module 805 of the portable device, the portable device further comprising a display 802, a camera 803, a processor 801, and a memory 804. This implementation allows to save computational power and therefore battery use of the portable device, as the determination of the liquid level is done in the server, but it requires an internet or other kind of network connection that allows the portable device to communicate with the server.

According to embodiments of the invention, the information regarding the liquid level, and the obtained images, may be stored in the memory 804 of the portable device, or in the server.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A computer-implemented method of detecting a liquid level inside a container, the method comprising the steps of:
   capturing, by a camera of a portable device, a first image of the container;
   providing the first image to an input layer of a convolutional neural network, CNN;
   obtaining, from a final layer of the CNN, the liquid level inside the container in the first image; and
   storing the obtained liquid level, wherein the CNN is configured to identify features of a plurality of volume indicators of the container in the first image and to determine the liquid level in the container in the first image based on the identified features, and
   wherein the plurality of volume indicators comprises at least one number and a plurality of scale markings,
   wherein the CNN is a modified residual neural network (ResNet) modified by one or more of:
      removing a final layer of the ResNet,
      inserting classes for classification of liquid level,
      inserting additional fully connected layers,
      performing dropout in the fully connected layers,
      introducing a regularization term,
      adding two dimensional convolutions,
      applying weight quantization, and
      folding convolutional layers onto each other.

2. The method according to claim 1, wherein the container is for infant nutrition, preferably a bottle for infant milk or milk formula.

3. The method according to any one of claim 1, wherein capturing the first image further comprises providing, by the portable device, to a user, guiding information to orientate the camera so as to capture at least a part of the container including the liquid level and the plurality of volume of the container.

4. The method according to claim 1, wherein the plurality of volume indicators represents at least 80% of the total volume of the container.

5. The method according to claim 4, wherein the scale markings on the container comprise a volume scale at increments of 5 to 20 millilitres, ml, preferably 10 ml.

6. The method according to claim 1, wherein capturing the first image comprises providing, by the portable device, guiding information so that the container is orientated perpendicularly with respect to a horizontal surface in the first image.

7. The method according to claim 6 wherein, the horizontal surface in the first image is at an angle with respect to a horizontal axis of the first image, the angle ranging from −45 to 45 degrees.

8. The method according to claim 1, wherein for determining the liquid level, the CNN determines that the liquid level corresponds to a highest substance level in the container, thereby considering that the liquid level includes a foam layer on top of a liquid layer.

9. The method according to claim 1, further comprising displaying, by the portable device, information about the obtained liquid level in the container in the first image.

10. The method according to claim 1, further comprising the steps of:
    capturing, by the camera, a second image of the container different from the first image, providing the second image to the input layer of the CNN and obtaining a liquid level inside the container in the second image, calculating, by the portable device, a difference in liquid level between the first image and the second image, and storing at least one of the obtained liquid level in the container in the second image and the calculated difference.

11. The method according to claim 10, further comprising displaying information about at least one of the obtained liquid level in the container in the second image, and information about the calculated difference.

12. The method according to claim 1, wherein the ResNet is a ResNet 50.

13. A system for detecting a liquid level inside a container, the system comprising:
    a portable device comprising
    a camera configured to capture a first image of the container;
    a processor configured to provide the first image to an input layer of a convolutional neural network, CNN, and obtain, from a final layer of the CNN, the liquid level inside the container in the first image, and
    a storage medium configured to store the obtained liquid level, and
    the CNN being configured to identify features of a plurality of volume indicators of the container in the first image, and to determine the liquid level in the container in the first image based on the identified features,
    wherein the plurality of volume indicators comprises at least one number and a plurality of scale markings,
    wherein the CNN is a modified residual neural network (ResNet) modified by one or more of:
      removing a final layer of the ResNet,
      inserting classes for classification of liquid level,
      inserting additional fully connected layers,
      performing dropout in the fully connected layers,
      introducing a regularization term,
      adding two dimensional convolutions,
      applying weight quantization, and
      folding convolutional layers onto each other.

14. The system according to claim 13, wherein the container is for infant nutrition, preferably a bottle for infant milk or milk formula.

15. The system according to claim 13, wherein the processor is further configured to control the portable device to provide guiding information during capturing of the first image so as to orientate the camera to capture at least a part of the container including the liquid level and the plurality of volume indicators of the container.

16. The system according to claim 13, wherein the plurality of volume indicators represents at least 80% of the total volume of the container.

17. The system according to claim 16, wherein the scale markings on the container comprises a volume scale at increments of 5 to 20 millilitres, ml, preferably 10 ml.

18. The system according to claim 13, wherein the processor is further configured to control the portable device to provide guiding information so that the container is orientated perpendicularly with respect to a horizontal surface in the first image.

19. The system according to claim 18, wherein the horizontal surface in the first image is at an angle with respect to a horizontal axis of the first image, the angle ranging from −45 to 45 degrees.

20. The system according to claim 13, wherein for determining the liquid level, the CNN is configured to determine that the liquid level corresponds to a highest substance level in the container, thereby considering that the liquid level includes a foam layer on top of a liquid layer.

21. The system according to claim 13, wherein the portable device further comprises a display configured to display information about the obtained liquid level in the container in the first image.

22. The system according to claim 13, wherein
the camera is further configured to capture a second image of the container different from the first image;
the processor is further configured to provide the second image to the input layer of the CNN, to obtain a liquid level inside the container in the second image, and to calculate a difference in liquid level between the first image and the second image, and
the storage medium is further configured to store at least one of the liquid level in the container in the second image and the calculated difference.

23. The system according to claim 13, wherein the ResNet is a ResNet 50.

24. The system according to claim 13, wherein the CNN is implemented in the portable device.

25. The system according to claim 13, wherein the CNN is implemented in a server communicating with the portable device.

26. The system according to claim 13, wherein the container comprises a top surface, a bottom surface, and a side surface, and wherein the top surface is removable from the container.

* * * * *